Oct. 10, 1933.  F. S. WOIDICH  1,929,462
COMBINATION TANK VENT, FLAME ARRESTER, AND AUTOMATIC SNUFFER
Filed July 30, 1930  8 Sheets-Sheet 1

Inventor:
Francis S. Woidich,
By Byrnes Townsend & Potter,
Attorneys.

Oct. 10, 1933.  F. S. WOIDICH  1,929,462
COMBINATION TANK VENT, FLAME ARRESTER, AND AUTOMATIC SNUFFER
Filed July 30, 1930  8 Sheets-Sheet 3

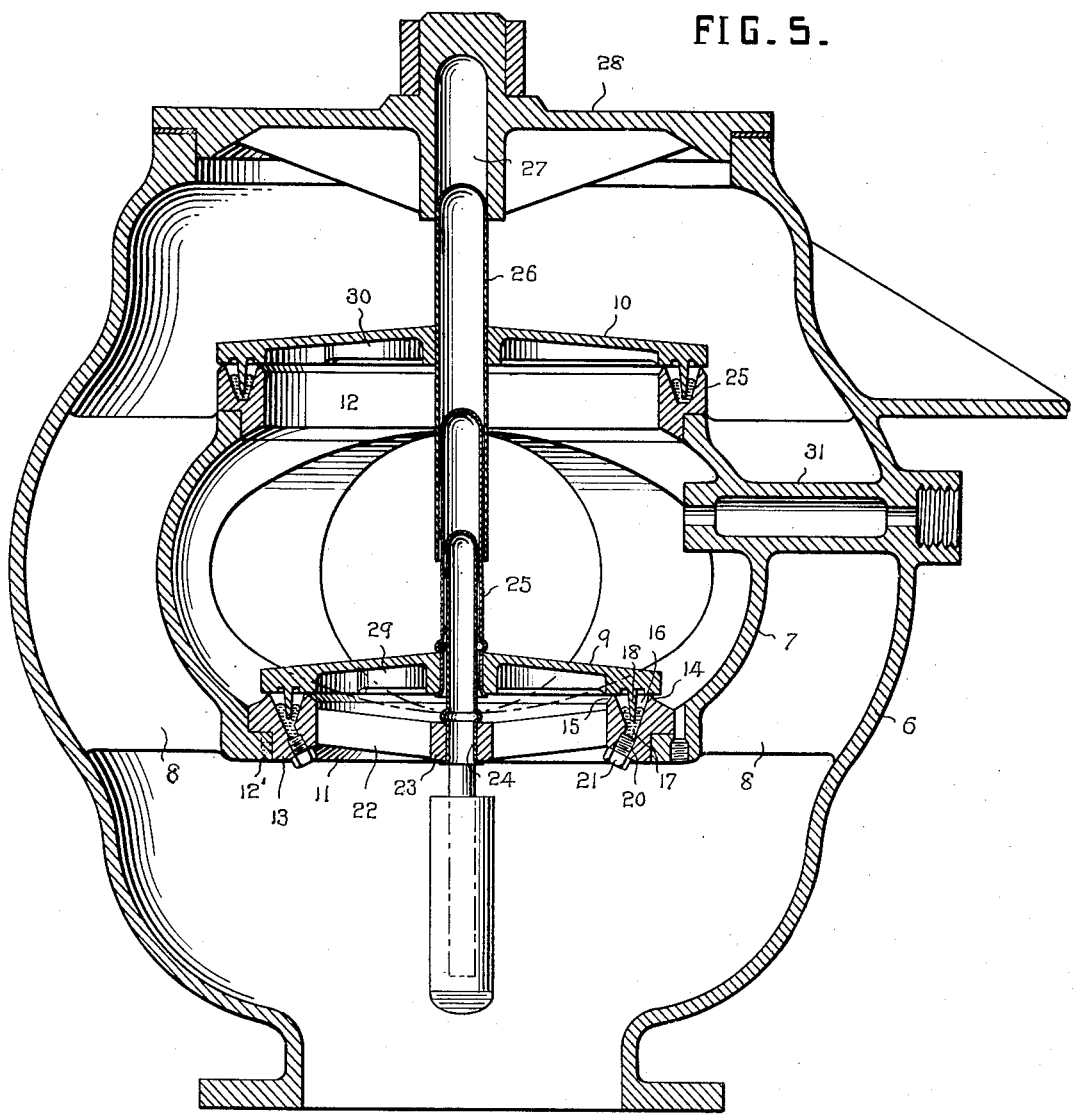

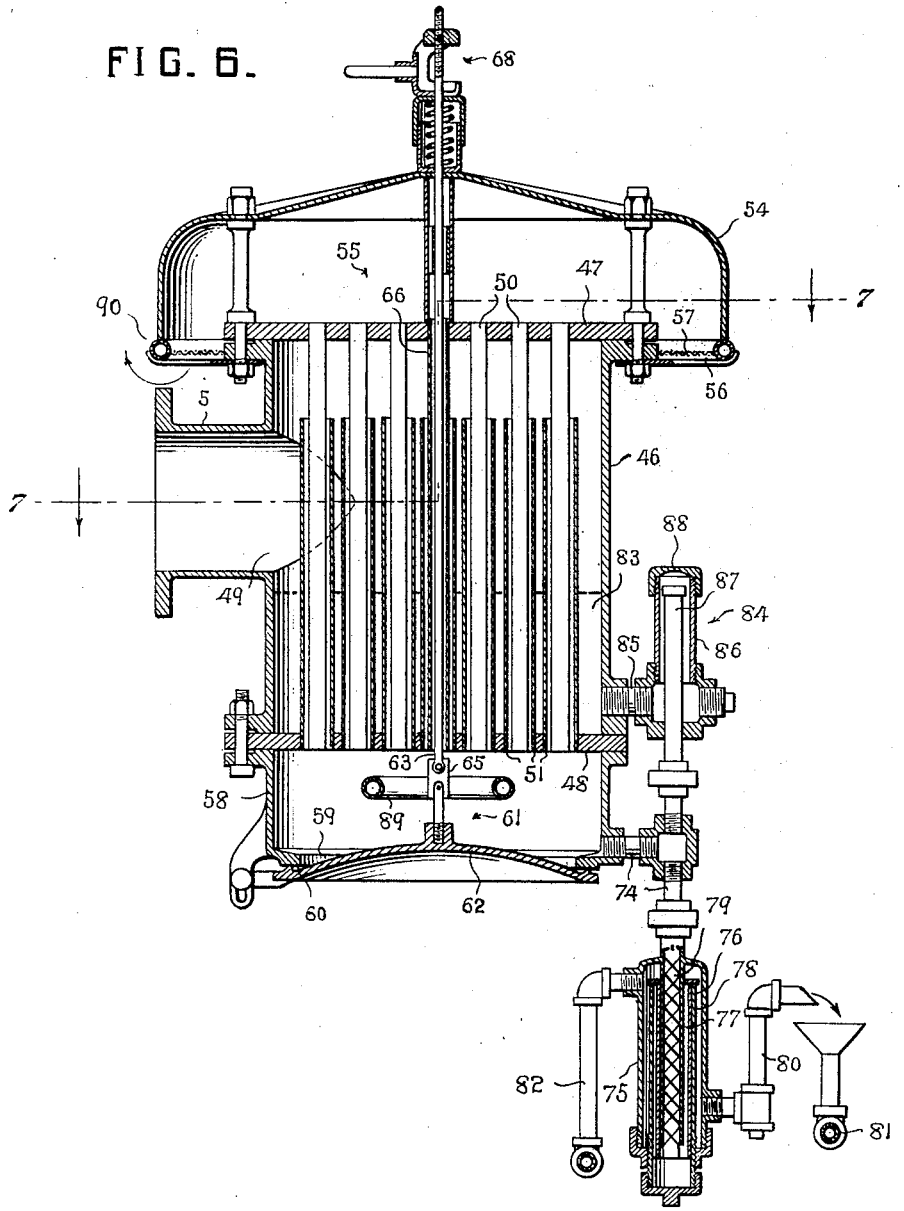

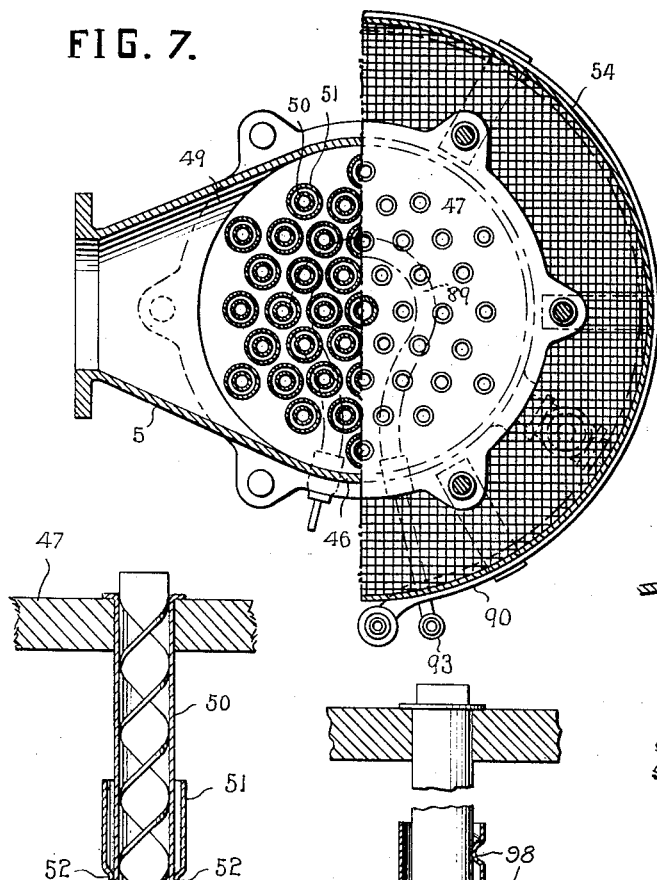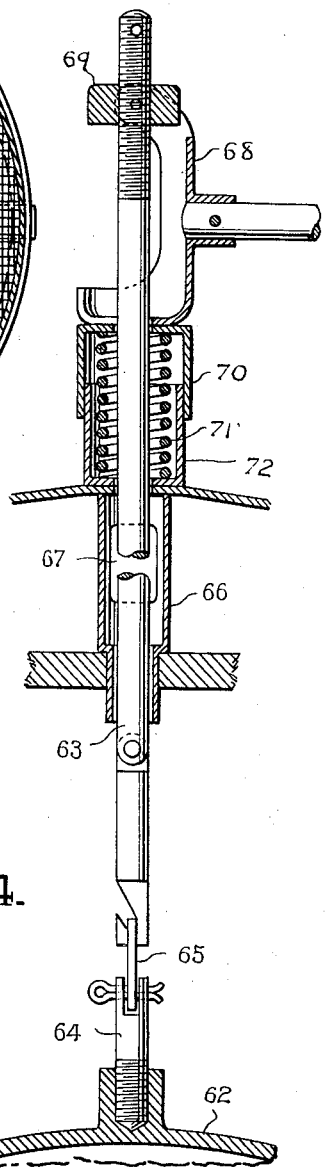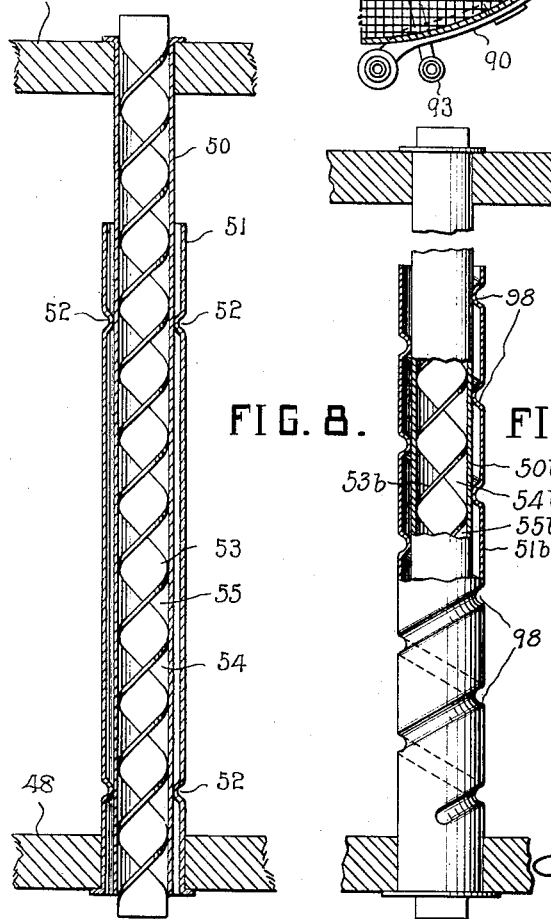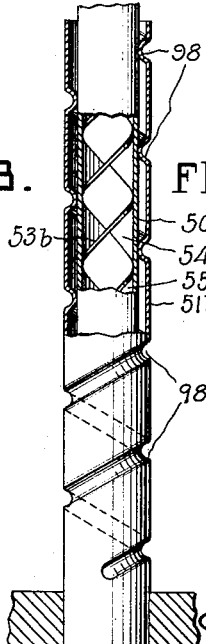

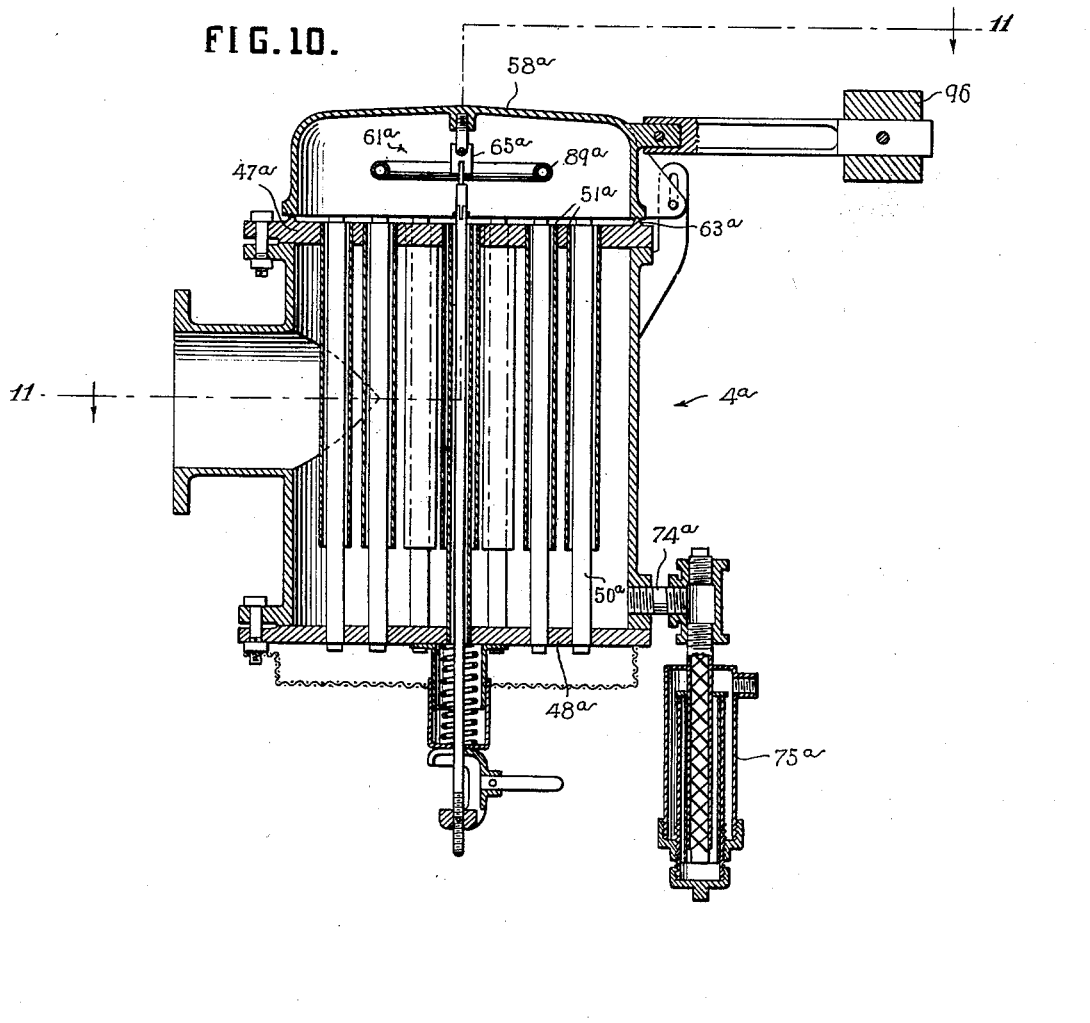

Oct. 10, 1933. F. S. WOIDICH 1,929,462
COMBINATION TANK VENT, FLAME ARRESTER, AND AUTOMATIC SNUFFER
Filed July 30, 1930 8 Sheets-Sheet 8
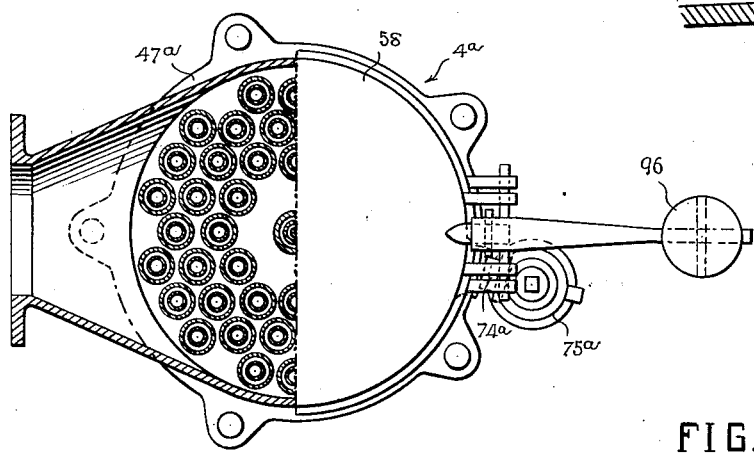
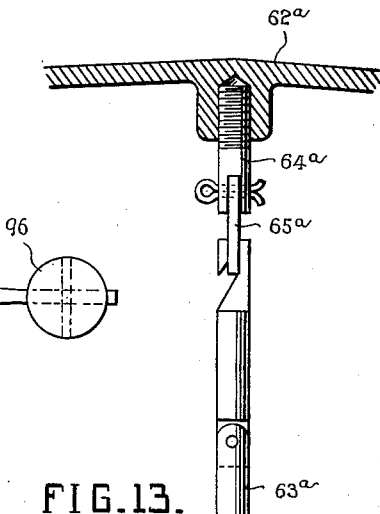
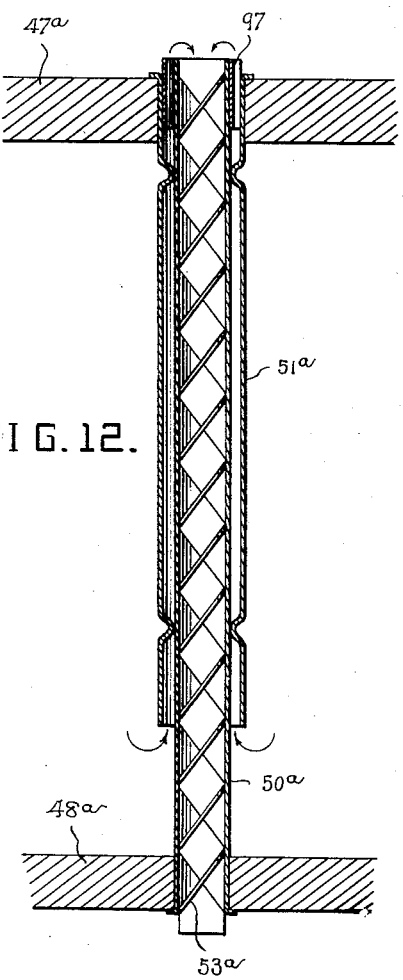
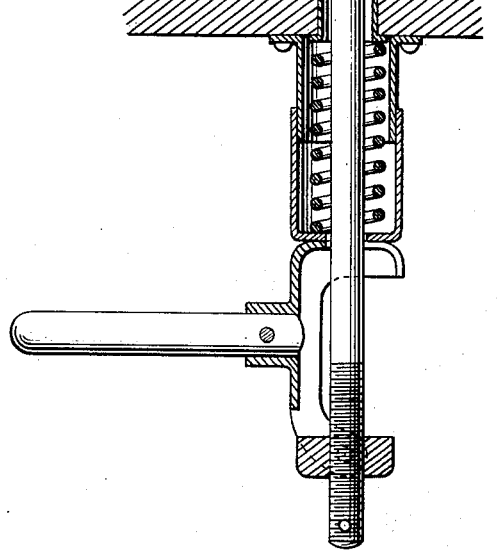

Patented Oct. 10, 1933

1,929,462

UNITED STATES PATENT OFFICE 1,929,462

COMBINATION TANK VENT, FLAME ARRESTER, AND AUTOMATIC SNUFFER

Francis Sales Woidich, Tulsa, Okla.

Application July 30, 1930. Serial No. 471,826

23 Claims. (Cl. 220—88)

This invention relates to a combination tank vent, flame arrester and automatic snuffer.

In the storing of fluids, particularly fluids of a volatile character such as crude petroleum or its derivatives, it is necessary to provide a vent for the storage tank in order that unsafe stresses will not be set up in the tank structure due to thermal expansion or contraction of the fluid, evaporation or condensation of the liquid—if such is stored in the tank—or increase or decrease in the quantity of fluid stored in the tank by reason of the addition or withdrawal thereof.

Since the vent provides communication between the atmosphere and the inside of the tank, there is present the danger that a "flashback" may occur, i. e. the escaping gases or vapors may be ignited by any sparks or flames which may be present in the vicinity of the vent, and the flame propagated to the interior of the tank. Hence, it is necessary that the vent be provided with an arrangement for arresting any flame which may be produced by the ignition of the gases issuing from the tank by way of the vent, and for preventing the flame from traveling into the tank.

It is also necessary to provide means for extinguishing any flame which may have penetrated into the interior of the flame arrester in order to prevent further penetration of the flame into the interior of the tank and to prevent destruction of the arrester, which would result from a continuation of the flame therein. This may be accomplished by a snuffer which closes communication between the source of supply of the combustible material i. e., the storage tank, and the atmosphere.

An object of the present invention is the provision of a combined tank vent valve, flame arrester and automatic snuffer, which will provide proper venting of the tank, will arrest propagation into the tank of any flame occurring adjacent the vent valve and will extinguish the flame if the same continues to exist.

Another object of the invention is the provision of a vent valve for a storage tank and apparatus for operating the valve as a snuffer to prevent the propagation into the tank of any flame occurring in the vicinity of the valve.

Another object of the invention is the provision of a flame arrester for use with a storage tank having a vent valve, which arrester will prevent any flame occurring therein from penetrating into the tank; will extinguish the flame; will condense and collect any condensible vapors escaping from the tank; will prevent any atmospheric moisture or dust from entering the tank; will provide a visible indication of the continuance of any combustion in the arrester; and will cool any flame occurring therein to prevent its continuance.

Another object of the invention is the provision of venting apparatus for storage tanks which meet the requirements of the Underwriters' Laboratories.

Another object of the invention is the provision of apparatus of the above type wherein the destructive effect of foreign substances such as water and dirt is minimized and the operation of the apparatus thereby is improved and its useful existence prolonged.

Other objects of the invention will appear from the following description and the appended drawings wherein:

Fig. 5 is an enlarged view similar to Fig. 2, showing the vent valve only,

Fig. 6 is a sectional elevation of the flame arrester,

Fig. 7 is a view of a cross-section taken along line 7—7 of Fig. 6,

Figs. 8 and 9 are fragmentary sectional views showing details, and

Figs. 10 to 13 are views corresponding to Figs. 6 to 9, and showing a modified form of the invention.

Fig. 14 is a view partly in cross-section showing a modified form of tube assembly.

Figure 1:
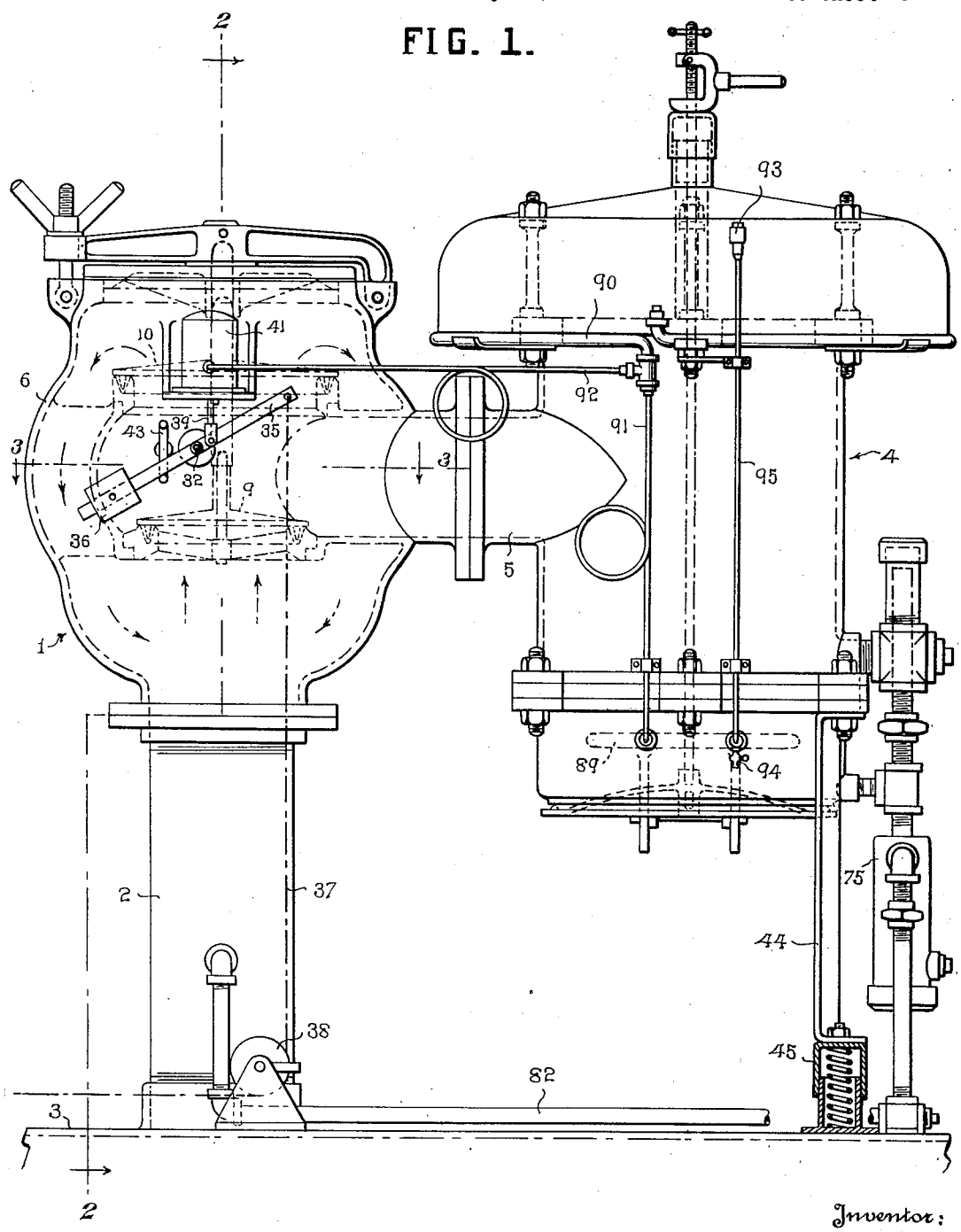
Fig. 1 is a side elevational view of one embodiment of the invention.

In Fig. 1 is shown a vent valve 1 mounted on the upper end of a breather pipe 2 which extends from the top wall of a storage tank 3, and a flame arrester 4 also mounted on the tank wall and connected to the valve 1 by a transfer pipe 5.

Figure 2:
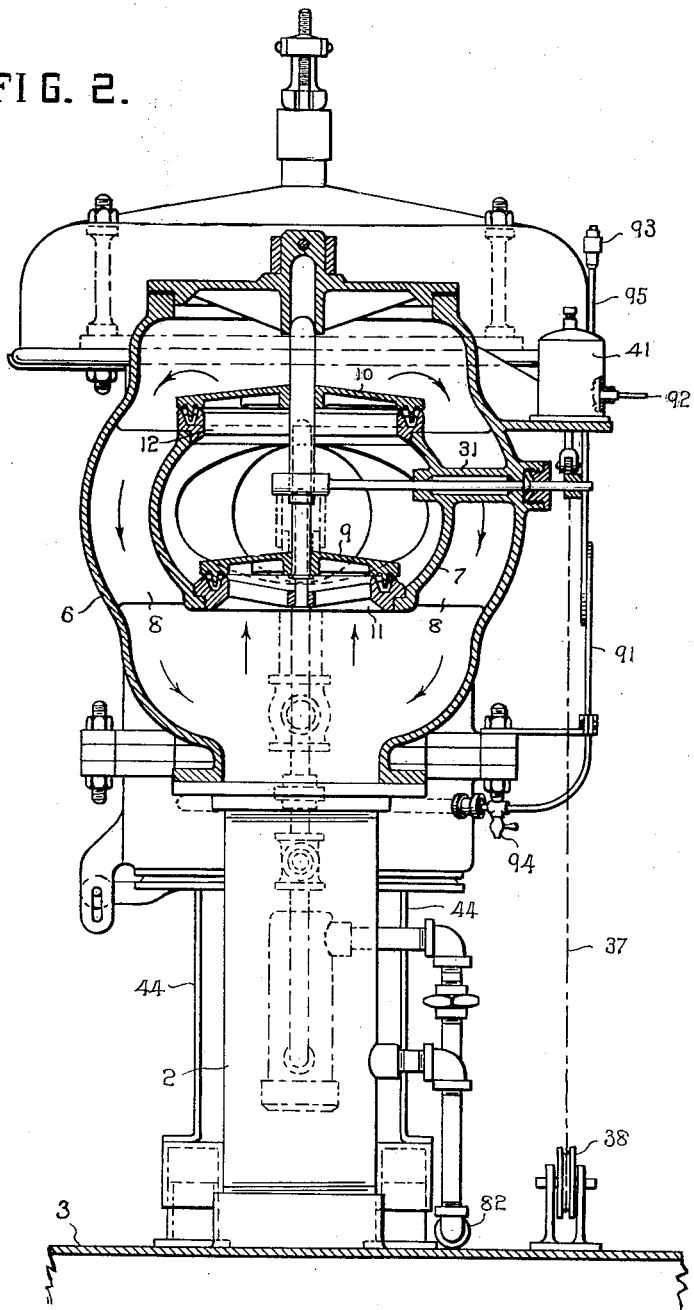
Fig. 2 is a view of a vertical cross-section taken along line 2—2 of Fig. 1.
Figure 3:
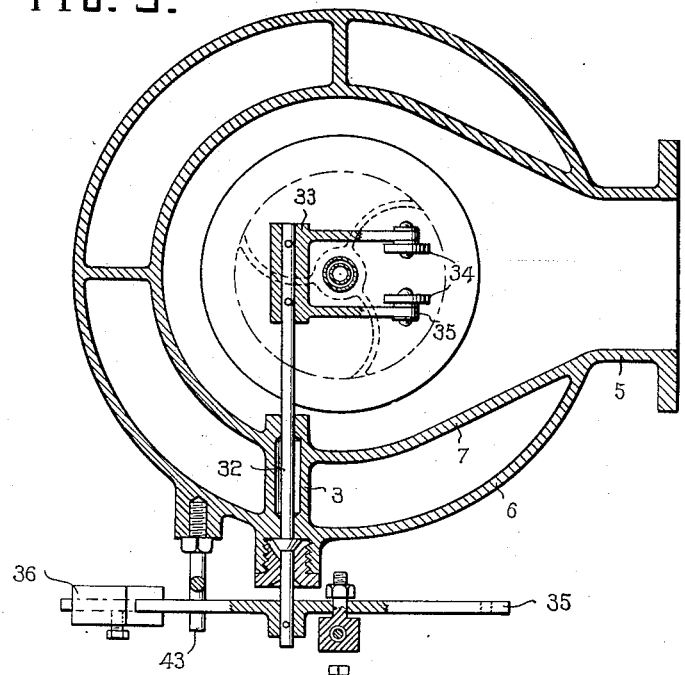
Fig. 3 is a view of a horizontal cross-section taken along line 3—3 of Fig. 1.
Figure 4:
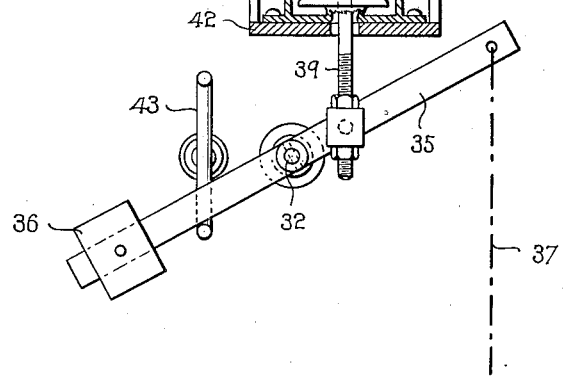
Fig. 4 is an enlarged view, partly in cross-section, showing a detail.

The valve 1, shown in greater detail in Figs. 2, 3 and 5, comprises principally a substantially cylindrical casing 6, a substantially cylindrical seat member 7 disposed concentrically within the casing 6 and connected thereto by integral ribs 8, and a pair of valve disks 9, 10, arranged to cooperate respectively with upper and lower ports 11, 12 formed in the seat member 7.

Secured to the seat member 7, at the lower port 11, by a bayonet joint 12', is a seat ring 13 having a pair of upstanding concentric, annular knife edges 14, 15 which cooperate with the valve disk 9 to provide a tight closure when the latter is seated. Between the knife edges 14, 15 is an annular trough 16 filled with a heavy sealing liquid 17, such as mercury. The valve disk 9 is provided with a downwardly extending annular fin 18 arranged to dip into the mercury 17 when the disk 9 is seated, thereby forming a liquid seal for the closure. Openings 20 closed by screw plugs 21 are provided for drawing off the sealing liquid 17.

The seat ring 13 is provided with integral spokes 22 extending inwardly to a hub 23 in which is secured an upwardly extending guide tube 24. The lower disk 9 has a central opening through which extends the guide tube 24, a second guide tube 25, secured to the disk 9 and telescoped over the stationary guide tube 24.

The upper port 12, which is somewhat larger than the lower port 11, is provided with a seat ring 25 similar to, but larger than the lower ring 13. The upper valve disk 10, which is larger than the lower valve disk 9, cooperates with its seat ring 25 in a manner similar to the lower valve disk and carries a guide tube 26 which telescopes over the guide tube 25, carried by the lower valve disk 9, and which extends into a guide well 27 formed in a cover 28 closing the upper end of the valve casing. Integrally formed on the under side of the lower valve disk 9 is a set of curved vanes 29 which extend from the center of the disk 9 to the edges. When the valve is opened, the impact of the fluid, flowing through the port 11, against the vanes 29 causes rotation of the valve disk 9 whereby uneven wear of the cooperating surfaces on the valve disk 9 and seat 13 is prevented. The rotation of the valve disks also serves to scour the guide tubes whereby scale, condensates and any other foreign substances are prevented from remaining on the guide tubes. The upper valve disk 10 is provided with a similar set of vanes 30, which operate in a manner similar to the vanes 29.

Extending through and rotatably mounted in the walls of the casing 6 and seat member 7 and an integral tube 31 extending therebetween is a shaft 32, which at one end terminates above the central portion of the lower valve disk 9 and which carries a normally horizontal bifurcate lever 33 having rollers 34 on the end of each arm 35 adapted to bear against the top surface of the lower valve disk 9. Carried on the other end of the shaft 32, which extends outside of the valve casing 6, is an operating lever 35 which carries a weight 36 at one end and which has an operating wire 37 connected to the other end, which wire passes around a pulley 38 mounted on the top of the storage tank 3.

Pivotally connected to a point on the lever 35 intermediate the shaft 32 and the operating wire 37, is a rod 39 which extends upwardly into a bellows 40 to the upper end of which the rod 39 is connected. The bellows 40 is inclosed in a fluid-tight casing 41 mounted on a shelf 42 formed integral with the valve casing 6 and filled with a thermally expansible fluid. A double stop 43 is provided for limiting the travel of the lever 35 whereby the mechanism connected to the lever 35 is protected from injury which it might suffer on account of too great a movement of the lever 35.

Opening into the seat member 7 is one end of the transfer pipe 5 which extends to the flame arrester 4 supported on the top of the tank 3, adjacent the vent valve 1 by a pair of legs 44 resting on and secured to a pair of cushioning devices 45. The flame arrester 4 is in the form of a substantially cylindrical casing 46 closed at both ends by tube sheets 47, 48, and having an opening 49 in the side wall communicating with the transfer pipe 5. A plurality of tubes 50, inserted in openings in the upper tube sheet 47, extend downwardly to the lower tube sheet 48 and a plurality of larger tubes 51, inserted in the lower tube sheet 48, extend upwardly somewhat more than half the distance to the upper tube sheet 47, each of the larger tubes 51 being telescoped over one of the smaller tubes 50.

The tube structure is shown in greater detail in Fig. 8. The inner tube 50 is positioned in the outer tube 51 by a plurality of indentations 52 on the latter which bear against the outer surface of the inner tube 50 to hold it uniformly spaced from the walls of the outer tube 51. Extending through the length of the inner tube 50 is a spiral member 53 providing a pair of spiral passages 54, 55 through the tube 50. It will be seen that a gas flowing through the inner tube 50 will follow a spiral path and any moisture or dust which may be entrained in the gas will be thrown against the tube walls by centrifugal action. The spiral member 53 also provides a much longer path for the gases than is provided by the same length of tube.

A substantially dome-shaped hood 54 is disposed over the upper tube sheet 47 with its sides spaced from the periphery of the tube sheet 47 to form a chamber 55 having an annular outlet 56. A protective wire screen 57 is secured over the outlet 56 to prevent insects, paper and dirt from being sucked into the arrester when the tank inhales air during the contraction period and to prevent birds from entering the arrester and building nests therein.

A substantially cup-shaped catch basin 58 having a large opening 59 in its bottom wall 60 is secured under the lower tube sheet 48 to form with the tube sheet a dirt-settling chamber 61, the opening 59 being closed by a cover 62 hinged to the catch basin 58. The cover 62 is retained in closed position by a hinged rod 63 connected to the cover 62 through a stud 64, a fusible link 65, which rod 63 extends through the entire length of the arrester casing 46 and projects above the top of the hood 54. A tube 66 provided with a vent 67 at its upper end extends between the bottom tube sheet 48 and the hood 54, and surrounds the rod 63 to serve as a guiding means therefor.

The upper end of the rod 63 is secured by a quick acting catch by which the rod 63 may be released to permit the cover 62 to swing to a partially open position whereby access to the interior of the flame arrester casing 46 may be had for the purpose of dumping from the settling chamber any sediment which may have been deposited in the catch basin 58, and any dust and sand which may have been inhaled by the arrester due to the occurrence of a sand storm at a contraction period of the tank. One arm of the U-shaped lever 68 is pivoted to a nut 69 threaded on the upper end of the rod 63 and the other arm which is bifurcate, engages the rod 63 and bears against the upper surface of an inverted cup 70 surrounding the rod 63 and urged upwardly by a spring 71 seated in a cup 72 telescoped in the first cup 70 and secured to the top of the hood 54. The lever 68 is provided with a handle by which it may be rotated to move the lower arm out of contact with the cup 70 to permit the rod 63 to drop until the nut 69 is engaged by the inverted cup 70.

For the purpose of removing water and any other liquids which may have been condensed out of the gas passing through the arrester, a drain pipe 74 leads from the catch basin 58 to a well 75 disposed below the catch basin 58, the pipe 74 entering the well 75 through the top and extending nearly to the bottom thereof. A corrugated sleeve 76, telescoped over the pipe 74 and spaced therefrom, extends from the bottom of the well 75 to a point near the top, forming with the pipe 74 and the well 75, two concentric, annular chambers 77, 78. An annular washer 79, slidable on the pipe 74, normally rests on the corrugated sleeve 76 and closes the top of the chamber 77 between the pipe 74 and the sleeve 76. A spiral member 79 similar to that shown in Fig. 8 is disposed in that portion of the drain pipe 74 which extends into the well 75.

A water removal pipe 80 leads from the bottom of the well and discharges into a waste line pipe 81 by which any water which may have been entrained in the air entering arrester 4 and condensed in the arrester is carried away. A second pipe 82 leads from the top of the well 75 to the breather pipe 2 whereby any liquid contents of the tank which may have been carried into the arrester 4 as vapor or entrained by the flow of gas from the tank 3 and condensed in the arrester 4 are returned to the tank 3.

In order to cool the tubes 50, 51 for the purpose of preventing the continuation of combustion in the arrester 4 and for providing a source of steam for extinguishing any flames in the arrester 4, the arrester casing 46 is provided with an oil-covered water bath 83 surrounding the tubes 50, 51 and filling the casing 46 up to the level of the opening 49 communicating with the transfer pipe. The level of the water comprising the water bath 83 is controlled by an overflow device 84 communicating with the interior of the casing by a pipe 85. The overflow device 84 comprises a casing 86 in which is disposed a pipe 87 connected to the drain pipe 74. The top of this pipe 87 is open and determines the level of the water in the water bath 83. When the height of the water bath 83 exceeds the height of the pipe 87, water flows through the tube 87 and out through the well until the water level reaches its normal height. A screw cap 88 is provided in the overflow device 84 for filling the water bath 83.

A substantially U-shaped tubular bulb 89 is disposed in the catch basin chamber 61 and a similar bulb 90 is secured to the edge of the hood 54. A conduit 91 connects the bulbs 89, 90 to each other and a second conduit 92 connects the bulbs 89, 90 to the bellows casing 41, thereby forming a closed system, which system is filled with a thermally expansible fluid. A normally closed filling funnel 93 and a drain cock 94 are provided in a third conduit 95 connected to the lower bulb 89 whereby the fluid may be introduced into or removed from the system.

The operation of the apparatus is as follows:

Upon an increase in pressure of the gas in the storage tank 3 above a predetermined value, the outlet valve disk 9 is raised from its seat 13 to permit the gas to flow from the tank 3 by way of the breather pipe 2 and the transfer pipe 5 into the flame arrester 4. In the flame arrester 4 the gas flows down through the annular passages formed by the telescoped tubes 50, 51 and into the chamber 61 and from thence in the opposite direction through the spiral passages 54, 55 in the inner tubes 50 to the upper chamber 55.

The tubes 50, 51 being surrounded by the water bath 83, which is normally somewhat cooler than the gas issuing from the storage tank 3, a considerable portion of the vapors entrained in the gas flowing through the tubes 50, 51 is condensed and the condensate is collected in the catch basin 58 together with any solid particles which may be contained in the gas. The uncondensed portion of the gas flows through the protective screen 57 into the atmosphere. The condensate flows from the catch basin 58 through the drain pipe 74 into the inner annular chamber 77 of the well 75. When the chamber 77 becomes filled, the condensate raises the check washer 79 and overflows into the outer annular chamber 78 from which the water, which is heavier than any of the condensed contents of the tank, is drawn off through the lower pipe 80 and discharged into the waste line 81 and the lighter liquid is drawn off through the upper pipe 82 and returned to the storage tank 3. Generally, sufficient water is collected in the catch basin 58 to fill the well 75, to such a height that substantially all of the lighter liquid will be returned to the tank 3 through the upper pipe 82 but water may be introduced into the well 75 for this purpose through the overflow pipe 87. The removal of any water which may enter the apparatus reduces the corrosive action of any soluble acid gases or vapors which may escape from the storage tank and thus the life of the apparatus is prolonged.

If the pressure in the storage tank 3 decreases below a predetermined value, the outlet valve 9 closes and the inlet valve 10 opens to permit air to flow into the tank 3. Air flows into the arrester 4 by way of the annular opening 56 and through the apparatus in a reverse manner to the flow of gas from the tank 3 to the air. Any water vapor which may be entrained in the air is condensed and is collected in the catch basin 58, together with any entrained particles of dirt and sand. The water is drawn off through the well 75, in the manner described above and the dirt is removed as sediment, through the quick dumping opening 60 in the bottom of the catch basin 58.

If the explosive mixture of combustible material and air which is in the arrester is lean in combustible material, the flame propagated upon ignition of the mixture is propagated at a very high speed and is accompanied by a high pressure wave. If the explosive mixture is rich in combustible material, the propagation of the flame is much slower, the temperature of the flame is much higher and there is little or no pressure wave. The device of the present invention is designed to be effective to arrest the propagation of a flame in both a lean mixture and in a rich mixture as either one, or both, may be present in the arrester.

Previously, it has been the practice to construct flame arresters having a member or members provided with a plurality of minute openings or passageways through which the gases could pass but which were of such small size that propagation of a flame therethrough would be prevented by the cooling action on the flame, presented by the arrester members and also by the mechanical obstructing action. It was found however that in order to be effective the passageways had to be of such small diameter that they were readily clogged by accumulations of dust and sand and by liquids which froze therein in periods of cold weather. By constructing the passage-ways of spiral form and with at least one abrupt change in direction, and by providing additional cooling means, I have found it possible to construct an effective arrester having passageways which are much larger in cross-section than the passageways found in the usual types of arresters; thus, there is substantially no possibility of the passage-ways becoming clogged.

In order to satisfactorily accomplish this result, the passageways in the present device are formed in two portions, the one to arrest the propagation of a flame in a lean explosive mixture and the other to arrest propagation in a rich explosive mixture. The propagation of a flame in lean explosive mixture is arrested in the spiral passageways 54 and 55, and the flame cannot penetrate to the settling chamber 61.

If, however, the flame is propagated in a rich mixture, the flame is hotter and penetrates further into the arrester. The penetration of this flame is arrested in the annular passageways between the tubes 50 and 51, the latter of which is cooled by the water bath 83 in contact therewith. The steam produced when the water bath is heated by a flame burning in the arrester serves to cool the flame and also to dilute the explosive mixture, both of which actions assist in extinguishing the flame. Thus it will be seen that by providing two different arresting means, it is possible effectively to prevent penetration into the tank of any flame, whether propagated in a lean explosive mixture or in a rich mixture.

If the gases should be ignited at a time when the explosive mixture is lean in combustible materials, the flame would burn inside the arrester and its existence would be unknown to the attendant. If this burning should continue unnoticed, serious damage to the arrester would result, hence it is necessary to automatically prevent the continuance of the flame by snuffing out the same or to provide some means of indicating to the attendant that a flame exists inside the arrester. The present invention provides both of these features.

According to the present invention the snuffing is effected by closing the vent valve in accordance with conditions in the arrester whereby positive snuffing is effected by a simple control device attached to the vent valve and the further flow of gas from the tank to the arrester is cut off and propagation of the flame toward the tank is thereby prevented.

Upon the continuance of a flame in the arrester 4, the thermally expansible fluid in one or the other, or both, of the bulbs 89, 90 is heated causing it to expand thereby increasing the pressure in the fluid system and compressing the bellows 40 to move the rod 39 downwardly. The lever 35 is rotated in a clockwise direction (as seen in Fig. 1) to rotate the shaft 32 in a similar direction whereby the bifurcate arms 35 of the lever 33 move the rollers 34 into contact with the top of the lower valve disk 9 thereby forcing it into its closed position against the seat 13 to close communication between the breather pipe 2 and the transfer pipe 5. The triple seal formed by the two knife edges 14, 15 cooperating with the bottom of the valve disk 9 and the fin 18 on the disk dipping into the liquid 17 in the sealing trough 16 provides an efficient closure which ensures that no gas will leak by the valve.

During this time of burning of flame in the arrester 4 the heat will melt the fusible link 65 whereby the cover 62 is released and swings to its fully opened position. A large quantity of cool air will rush into the tubes 50, 51 and will sweep out any combustible material which may be in the tubes and will also cool the bulbs 89, 90 whereby the fluid contained therein will contract and permit the valve closing apparatus to be returned to its normal position by the influence of gravity upon the counter-weight 36, thus permitting normal action of the outlet valve 9.

The dropping of the cover 62 provides a visible signal to inform an attendant that a flashback has taken place in the apparatus so that, in case no automatic snuffer has been installed, the closing apparatus for the outlet valve 9 may be actuated manually by means of the wire 37 to close the snuffer valve 9. After the flame has been snuffed out, the vent valve will continue to operate as before.

If a flash-back occurs at a time when the explosive mixture is lean in combustible materials, the flame propagation is accompanied by a high pressure wave. This pressure is relieved by the opening of the cover 62 against the force of the spring 71 so that no injury to the arrester structure or vent valve mechanism will be caused by such pressure. Where a flashback occurs at a time when the explosive mixture is rich in combustible material, no destructive pressure is set up hence the spring 71 is made strong enough so that only the very high pressure waves can force open the cover 62.

If the well 75 should not contain any liquid when a flame occurs in the arrester 4 and gas is being vented through the well 75, the propagation of a flame in the well 75 would be checked by the spiral passage-ways in the drain pipe 74 operating in a manner similar to the operation of the spiral passageways 54, 55 in the arrester tubes 50, 51.

The modified form of flame arrester 4a (shown in Figs. 10 to 13), although somewhat different in structure and operation than the first form, cooperates with the vent valve in the same manner as the first form and hence only the arrester will be described. In this form of the invention the arrester is inverted and the outer tubes 51a depend from the upper tube sheet 47a, over which is hinged a cover 58a cooperating with a knife edge 63a on the upper tube sheet 47a and connected through a stud 64a, a fusible link 65a and a hinged rod 63a to a quick releasing latch 68a depending from the lower tube sheet 48a. A counter-weight 96 is provided for swinging open the cover 58a when the fusible link 65a is melted. Inasmuch as the discharge ends of the inner tubes 50a are directed downwardly, no hood is necessary and the wire screen 57a is disposed over the entire set of tube ends.

In this form of arrester, no water bath is employed. When a flame occurs in the arrester, the fusible link melts to permit the weight to open the cover 58a. When this occurs, cool air is drawn through the inner tubes 50a thereby expelling the combustible material. The gases issuing from the tank pass through the outer tubes directly into the atmosphere and hence there is no material in the inner tubes which will support combustion. However, a flame may continue to burn at the upper end of the arrester.

This flame is snuffed out by the action of the snuffer in response to the heating of the bulb 89a. Only one bulb is necessary here because, irrespective of where the flame occurs in the arrester, the bulb will be sufficiently heated to operate the snuffer. If the device has no automatic snuffer, the opening of the cover 58a and the presence of flames can be seen by the attendant who can snuff the flames manually.

No water bath is necessary in this form of the device, and hence no overflow device is provided. A drain pipe 74a and a well 75a are provided as in the first form.

The inner tube 50a may be provided with an inner member similar to the spiral member 53 shown in Fig. 8 or it may be provided with a member 53a generally spiral in form but formed by making a plurality of bends in an elongated strip (as shown in Fig. 12) instead of a continuous curve (as shown in Fig. 8). This form of spiral member 53a may also be used in the first form of arrester.

A corrugated collar 97 is disposed in that portion of the annular space between the inner and outer tubes 50a, 51a which is adjacent the upper tube sheet 47a whereby heat may be conducted from the tubes 50a, 51a to the upper tube sheet 47a and thus be radiated by the upper tube sheet 47a, the upper face of which is open to the atmosphere when the cover 58a is in open position.

This form of arrester operates, in general, in the same manner as the first form, the principal difference being in the lack of necessity for a water bath since the greater part of the combustion takes place above the upper tube sheet whereby there is no distinctive heating of the arrester. Here, the combustible gas and vapor contained in the chamber 61a and the tubes 50a, 51a are swept upwardly away from the arrester by the rush of air through the tubes which takes place when the cover 58a is opened. Thus no cooling of the tubes is necessary as in the first form.

In Fig. 14 is shown a modified form of tube construction. The inner tube 50b is positioned in the outer tube 51b by an inwardly projecting spiral bead or ridge 98 formed on the outer tube 51b and bearing against the outer wall of the inner tube 50b. This bead 98 not only serves as a spacing means for the inner tube but also serves to give to the passageway between the tubes 50b and 51b a spiral shape whereby the gases passing through the space between the tubes 50b and 51b follow a winding, or spiral, course. The effect of this spiral movement of the gases is the same as the effect of the spiral movement of the gases through the passageways 53 and 55 as above described.

From the above disclosure, it should be apparent that the present invention provides apparatus for venting a storage tank, which is fully automatic in its operation, and which completely prevents the penetration into the tank of any flame occurring in the vicinity of the valve by arresting the propagation of the flame and by completely extinguishing the same before it can heat the apparatus sufficiently to damage the same.

I claim:

1. The combination with a fluid reservoir, of a vent valve on said reservoir and means including a thermally responsive element active upon the occurrence of combustion adjacent said valve for closing said valve and active only during the occurrence of such combustion for retaining it in closed position.

2. The combination with a fluid reservoir, of a breather pipe, a flame arrester connected thereto, and a self-actuating vent valve disposed in said pipe between said flame arrester and said reservoir, and thermally responsive means for closing said valve and for maintaining it in closed position only during the occurrence of combustion adjacent said valve.

3. The combination with a fluid reservoir, of a breather pipe on said reservoir, a flame arrester connected to said pipe, a vent valve in said pipe between said reservoir and said arrester, and means for closing said valve and retaining it in closed position only during the occurrence of combustion adjacent said valve.

4. The combination with a fluid reservoir, of a breather pipe on said reservoir, a flame arrester connected to said pipe, venting means in said pipe, between said reservoir and said arrester, normally closing said pipe and opened upon the occurrence of a predetermined maximum or minimum pressure in said reservoir, and means acting upon said venting means for closing the same and retaining the same in closed position only during the occurrence of combustion adjacent said valve.

5. A flame arrester comprising a casing and a plurality of members therein forming a plurality of restricted, reversely-bent passageways extending through said casing.

6. A flame arrester comprising a casing, a conduit in said casing and means in said conduit defining a winding passageway extending through said casing, said passageway being of such form that fluid flows through said passageway only in a complete spiral turn.

7. A flame arrester comprising a casing, a plurality of substantially parallel conduits extending therethrough and means in said conduits for effecting the flow of a fluid through said conduits in a plurality of spiral paths.

8. In a flame arrester, the combination with a casing, of a tubular member forming a passageway through said casing and means disposed in said member for imparting a swirling and generally spiral motion to a fluid flowing through said passageway.

9. A flame arrester comprising, a casing, and a plurality of members forming a passageway through said casing, said passageway having a plurality of concentric serial portions each of which portions has a substantially uniform cross-sectional area throughout its length, one portion of said passageway being restricted relative to another of said portions.

10. In a flame arrester, the combination with a casing, a plurality of members forming passageways extending through said casing, a member forming a chamber constituting a portion common to all of said passageways, an opening in said last-named member, and a cover for closing said opening.

11. A flame arrester comprising a casing, a plurality of members forming reversely bent passageways through said casing, said passage ways opening into a common chamber at the reverse bends, a cover over the end of said casing opposite the reverse bends in said passageways and means for opening said cover.

12. A flame arrester comprising a casing, a member forming a flame arresting passage extending through said casing, a settling chamber adjacent one end of said member, a cover for said chamber and a quick releasing latch for retaining said cover in closed position.

13. A flame arrester comprising a casing, a member forming a flame arresting passage extending through said casing, a cover closing one end of said casing and disposed opposite one end of said passage, and means resiliently maintaining said cover in closed position.

14. In a flame arrester, the combination with a casing, of a plurality of parallel vertical tubes extending therethrough, a second set of tubes disposed one about each of said first tubes respectively and extending from the bottom of said first tube to a point intermediate the ends thereof, said tubes being open at their lower ends, and an incombustible evaporable cooling medium surrounding said second tube and extending to a point intermediate the ends thereof.

15. Flame arresting and snuffing apparatus for combustible material comprising a flame arrester, a snuffer and thermally-actuated means, comprising members disposed in the regions in said arrester corresponding to the combustible limits of the combustible material in said arrester, for operating said snuffer.

16. The combination with a storage tank, of a vent valve on said tank, a flame arrester connected to said valve and comprising a casing, flame arresting means in the casing, means surrounding said flame arresting means for condensing the volatile materials escaping from said tank, a settling chamber adjacent said flame arresting means, and a device connected to said chamber for separating two immiscible liquids of different specific gravities.

17. The combination with a storage tank, of a vent valve on said tank, a flame arrester having means for condensing vapors escaping from said tank, means for conducting said condensate back to said tank, and flame arresting means interposed between said tank and said condensing means.

18. The combination with a storage tank and a flame arrester comprising a casing and means for separating solids, liquids and condensed vapors from gases passing through said casing, of means for withdrawing said liquids and condensed vapors from said casing and for separating two immiscible components thereof, and means for returning at least one of said components to said tank.

19. The combination with a storage tank and a vent valve therefor, of a flame arrester connected to said valve and constituting means for separating solids, liquids and condensed vapors from gases passing therethrough, and means connected to said flame arrester for withdrawing said liquids and condensed vapors from said flame arrester, and for separating two immiscible components of said withdrawn materials, said last-named means including a second flame arrester for preventing the propagation into said first flame arrester of combustion occurring in said last named means.

20. In a flame arrester, the combination with a casing of a tubular member forming a passageway through said casing and a second tubular member of smaller diameter disposed coaxially within said first member.

21. The invention as set forth in claim 20 wherein said inner member is provided with means forming a spiral passageway therethrough.

22. The invention as set forth in claim 20 wherein said outer member is provided with an inwardly directed spiral ridge forming with said inner member a spiral passageway.

23. The invention as set forth in claim 20 wherein a spiral bead is indented in said outer member and bears against the outer wall of said inner member.

FRANCIS SALES WOIDICH.